United States Patent
Lazarus et al.

(10) Patent No.: US 6,956,873 B2
(45) Date of Patent: Oct. 18, 2005

(54) ARRANGEMENT FOR DERIVING A LOCAL CLOCK IN A PACKET CABLE TELEPHONY MODEM

(75) Inventors: David Beryl Lazarus, Elkins Park, PA (US); Yucheng Jin, Chalfont, PA (US)

(73) Assignee: General Instrument Corporation, Horsham, PA (US)

( * ) Notice: Subject to any disclaimer, the term of this patent is extended or adjusted under 35 U.S.C. 154(b) by 828 days.

(21) Appl. No.: 09/861,750

(22) Filed: May 21, 2001

(65) Prior Publication Data

US 2002/0172189 A1 Nov. 21, 2002

(51) Int. Cl.[7] ................................................. H04J 3/06
(52) U.S. Cl. ....................................... 370/518; 375/373
(58) Field of Search ................................. 370/376, 458, 370/503–508, 516–519; 375/355–356, 363–364, 373, 376; 327/156, 159, 147, 295; 708/251; 715/500.1

(56) References Cited

U.S. PATENT DOCUMENTS

| | | | | |
|---|---|---|---|---|
| 4,596,026 A | * | 6/1986 | Cease et al. ................. | 370/505 |
| 4,928,275 A | * | 5/1990 | Moore et al. ................ | 370/506 |
| 5,119,406 A | * | 6/1992 | Kramer ....................... | 370/504 |
| 5,136,617 A | | 8/1992 | Stenard | |
| 5,577,258 A | * | 11/1996 | Cruz et al. ................ | 715/500.1 |
| 5,638,010 A | * | 6/1997 | Adams ........................ | 327/295 |
| 5,822,383 A | | 10/1998 | Muntz et al. | |
| 6,028,488 A | * | 2/2000 | Landman et al. ........... | 327/156 |
| 6,072,344 A | | 6/2000 | Larsson | |
| 6,160,571 A | | 12/2000 | Wang | |
| 6,160,816 A | | 12/2000 | Tanaka | |
| 6,269,103 B1 | * | 7/2001 | Laturell ....................... | 708/251 |
| 6,501,809 B1 | * | 12/2002 | Monk et al. ................. | 375/376 |
| 6,754,295 B1 | * | 6/2004 | Hartnett ....................... | 375/356 |

* cited by examiner

*Primary Examiner*—Duc Ho
*Assistant Examiner*—Phuongchau Ba Nguyen
(74) *Attorney, Agent, or Firm*—Mayer Fortkort & Williams PC; Karin L. Williams, Esq.

(57) ABSTRACT

A broadband terminal interface unit for use in an HFC communication network includes a phase-locked loop for providing a smooth transition between a CMTS-provided "national" clock and a local clock when the CMTS clock is lost (or before it is required). By controlling the tracking range of the PLL, the sensitivity of the circuit is controlled so that some drift in the national clock can be accommodated without unnecessarily reducing the performance of the components within the broadband terminal interface unit.

7 Claims, 2 Drawing Sheets

ARRANGEMENT FOR DERIVING A LOCAL CLOCK IN A PACKET CABLE TELEPHONY MODEM

TECHNICAL FIELD

The present invention relates to a hybrid fiber-coax (HFC) communication system and, more particularly, to an arrangement for deriving a clock signal used with inbound and outbound audio signals in the communication system.

BACKGROUND OF THE INVENTION

As originally designed and implemented, cable communication systems used only coaxial cable between a head-end controller (or distribution station) and the customer. Newer cable systems tend to be hybrids of optical fibers and coaxial cable; optical fiber being used for the long-haul portion of the network, and the coaxial cable being used to bring the communication from "curbside" into a home or office (in general, distances of less than a few thousand feet are spanned by a coaxial cable in such a network). With the growth of computer networks and a desire to provide real-time interactive services to the customer, the need has arisen for an efficient means to provide two-way (i.e., bidirectional) communication over an existing HFC network. A number of service providers currently furnish two-way services over cable. Providing customers with the ability to transmit data upstream requires service providers to reserve sections of the cable spectrum (bandwidth) or time slots for the upstream communication. The "upstream" voice signal originating with the customer is first packetized, usually forming a pulse code modulated (PCM) signal, at a predetermined bit rate. The bit rate is controlled by a known clock signal.

In prior art arrangements, the clock signal used for timing the collection of PCM samples of both inbound (downstream) and outbound (upstream) audio signals (e.g., voice signals) is derived from a "national" clock transmitted downstream by the cable modem termination system (CMTS). This signal is recovered by the local cable modem and divided down to the rate used within the modem (for example, 4.096 MHz). The use of a "national" signal thus provides system-wide synchronization. There is a clear advantage in using a single clock source for synchronizing the sampling at both ends of the telephone connection. For example, the common clock prevents clock slip or drift. Without a common clock, the sampling clocks at each customer's cable modem will drift apart and this drift will empty the "jitter buffer" at one end of a connection and overflow the jitter buffer on the other end of the connection. The one direction delay of the connection will change and audio samples may be lost. As a result, fax and modem calls may fail after a long period of time.

If the downstream signal is lost, the derived CMTS clock signal will have unpredictable characteristics. Failure of various components within the broadband terminal unit (BTI) at the customer's premise may result. In the past, a local reference clock has been used within the BTI to provide a backup clock upon failure of the CMTS-sent national clock. However, transition between the two clock sources will usually create glitches that could lead to improper operation of the DSP and/or the codec.

Thus, a need remains in the art for an arrangement for insuring a smooth transition from the national clock to the local clock upon loss of the national clock, as well as a smooth transition from the local clock to the national clock upon the recovery of the national clock.

SUMMARY OF THE INVENTION

The need remaining in the prior art is addressed by the present invention, which relates to a hybrid fiber-coax (HFC) communication system and, more particularly, to an arrangement for deriving a clock signal used with inbound and outbound audio signals in the communication system.

In accordance with the present invention, a phase-locked loop is included within the customer's BTI and is used to provide a "graceful" transition between a national clock and a local reference clock. The voltage-controlled oscillator (VCO) within the PLL has an oscillating range of $V_{ref} \pm n$ %, where n is a predetermined quantity that is large enough to accommodate an acceptable drift in the national clock, yet small enough to protect the circuits within the BTI using this signal from seeing an out-of-range frequency. More particularly, when the national clock (CMTS-derived clock) is present, the PLL will phase lock to the CMTS clock and the output will precisely track the national clock source, providing a synchronized clock to the components within the BTI. When the CMTS clock is lost, not yet acquired, or for any other reason out of the tracking range of the PLL, the PLL will automatically enter the "free-run" mode.

In a particular embodiment of the present invention, the free-run frequency is defined as the center frequency of the VCO (or one of its limit frequencies). As a result of the nature of the PLL circuit and the limited range of the VCO, the PLL transition will be continuous, and the output frequency will remaining in the normal operating range of the BTI circuitry.

Other and further aspects and elements of the present invention will become apparent during the course of the following discussion and by reference to the accompanying drawings.

DETAILED DESCRIPTION

Figure 1:
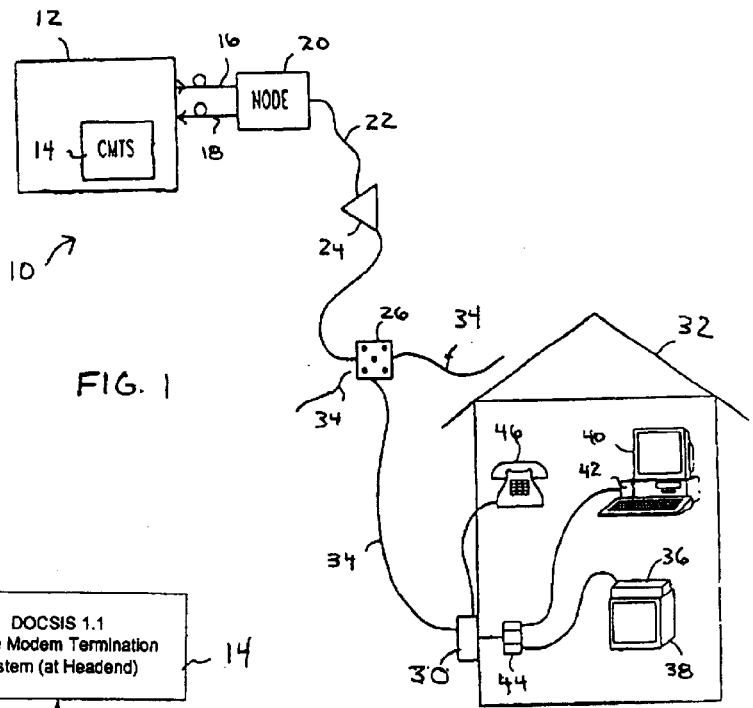
FIG. 1 illustrates, in simplified form, an exemplary prior art HFC network.

FIG. 1 illustrates a portion (in simplified form) of an exemplary HFC communications network 10 comprising a head-end communication element 12 including a cable modem termination system (CMTS) 14 for controlling the bi-directional communication between information sources and a plurality of HFC network subscribers. Head-end 12 provides downstream communication along a first signal path 16 (which may comprise an optical fiber) and, similarly, accepts upstream communication along a second signal path 18. As shown in FIG. 1, first and second signal paths 16, 18 are coupled to a communication node 20, where node 20 may be used to provide the translation of the signals from the optical signal paths onto a coaxial cable transmission path 22. From node 20, downstream signals are transmitted over cable 22 through active amplifiers 24 and are intercepted by a tap 26. Tap 26 routes a portion of the signal to a broadband terminal interface (BTI) 30 located at or near a subscriber's premises 32. A drop cable 34 is used to connect tap 26 to BTI 30 (as shown, tap 26 comprises a plurality of additional drop cables 34, where each drop cable will be coupled to a different BTI (not shown), associated with various other subscribers' premises). In a preferred embodiment, drop cable 34 comprises a coaxial cable. When used herein, the phrase "broadband terminal interface" (or the term "BTI") refers to a device for transmitting and receiving data, voice and/or video over an HFC network. Alternative terminology accepted in the art for such an interface includes a "communications gateway" ("CG") or "coaxial termination" (CT) unit. The term "broadband terminal interface" unit is not intended to be limiting and thus encompasses equipment which is located on the outside of a home, in the home (such as in an attic, basement or equipment closet), or in any other preferred location. Businesses can also use broadband terminal interface units for the transmission and reception of data, voice and/or video signals.

Referring again to FIG. 1, subscriber's residence 34 may comprise a set-top box (STB) 36 which is typically connected to a television 38, as well as a computer 40 which can contain a cable modem 42. These units are typically connected through a splitter 44 to BTI 30. In accordance with the present invention, downstream and upstream audio communication signals to/from a telephone 46 is also supported by BTI 30. In particular, and as will be discussed in detail below, BTI 30 of the prior art is modified to provide an improved local clock signal for the controlling communication between BTI 30 and telephone 46.

Figure 2:
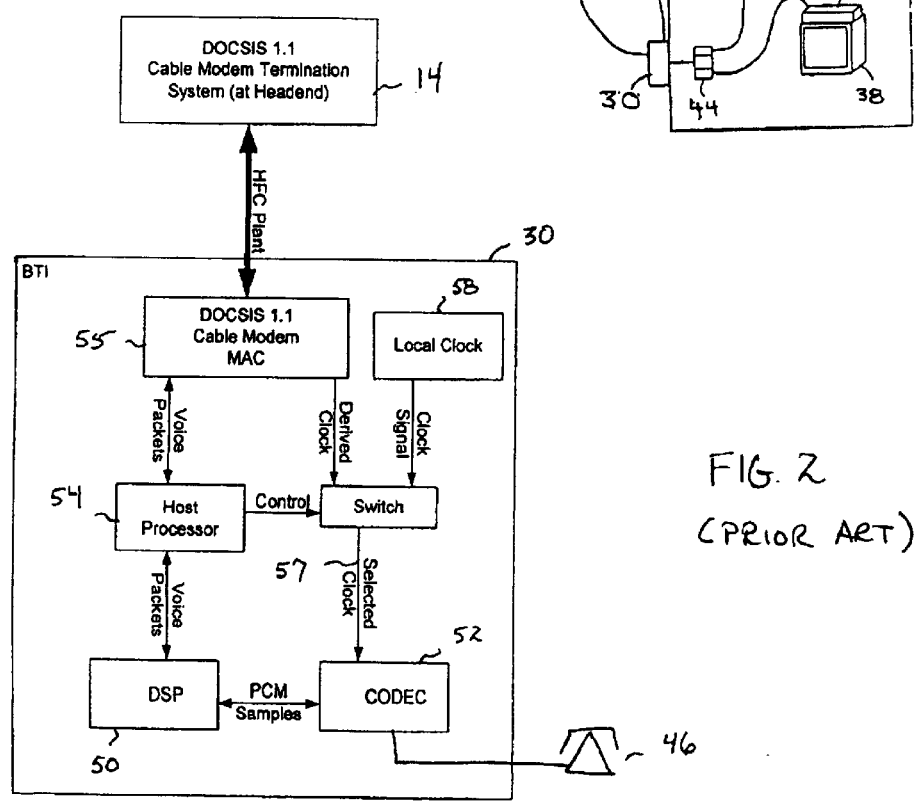
FIG. 2 contains a diagram of various components of a prior art HFC network, including an exemplary broadband termination unit (BTI)

An exemplary broadband terminal interface (BTI) unit 30 of the prior art is shown in FIG. 2, where only components relevant to the discussion of the present invention are illustrated in detail. As shown, BTI 30 includes a digital signal processor (DSP) 50, which is used to process (among other things) voice signals originating at telephone 46 of the subscriber for upstream transmission over the coaxial portion of the HFC network. A codec 52 (a "coder/decoder") receives the incoming voice signal and is used to digitize the signal into a form acceptable for transmission. In most systems, a pulse code modulated (PCM) signal is used. The PCM output from codec 52 is then applied as an input to DSP 50, which assembles the PCM voice traffic into packets for upstream transmission. A host microprocessor 54 is included in BTI 30 and may contain a memory unit (e.g., RAM) for storing data relative to the operation of BTI 30 and various devices within the residence. The data may include, for example, the number and type of set-top boxes connected to the BTI, as well as the number and type of modem connections 42 and telephone connections 46. Upon receiving a command from host microprocessor 54 to begin transmitting data, DSP 50 will transfer the assembled packets to host microprocessor 54, which then sends the packets out into the HFC network via a cable modem MAC 55. In the downstream direction, voice traffic received by BTI 30 will be processed by DSP 50 and sent as PCM samples to codec 52, which will then "decode" the PCM samples and supply the received voice signal to telephone 46.

A clock signal line 57 is provided as an input to codec 52, and is used to time the collection of PCM samples for both upstream and downstream audio signals. In an exemplary embodiment, the samples are collected at an 8 kHz rate and each sample comprises an 8 bit word. A conventional BTI is configured to support four separate bi-directional channels to/from a subscriber's residence, resulting the need for a 2.048 MHz (or 4.096 MHz) PCM sample clock (leaving room for either doubling the number of channels, or the number of bits per sample). As discussed above, and referring to FIGS. 1 and 2, BTI 30 can derive this clock from the downstream signal transmitted by CMTS 14. This signal is recovered within cable modem MAC 55 and is used to generate the required clock output on line 57 (either the 2.084 or 4.096 MHz signal). Since CMTS 14 broadcasts to each BTI using the same "national" clock signal, system-wide synchronization is achieved and the use of a common clock prevents clock "slip" or "drift". However, if the downstream signal is lost, the derived CMTS clock signal will have unpredictable characteristics. Failure of DSP 50 can result, and sample synchronization is lost. A local reference clock 58 may be used in these situations, but switching between the CMTS-provided national clock and the local clock can result in lost data as the switchover occurs.

Figure 3:
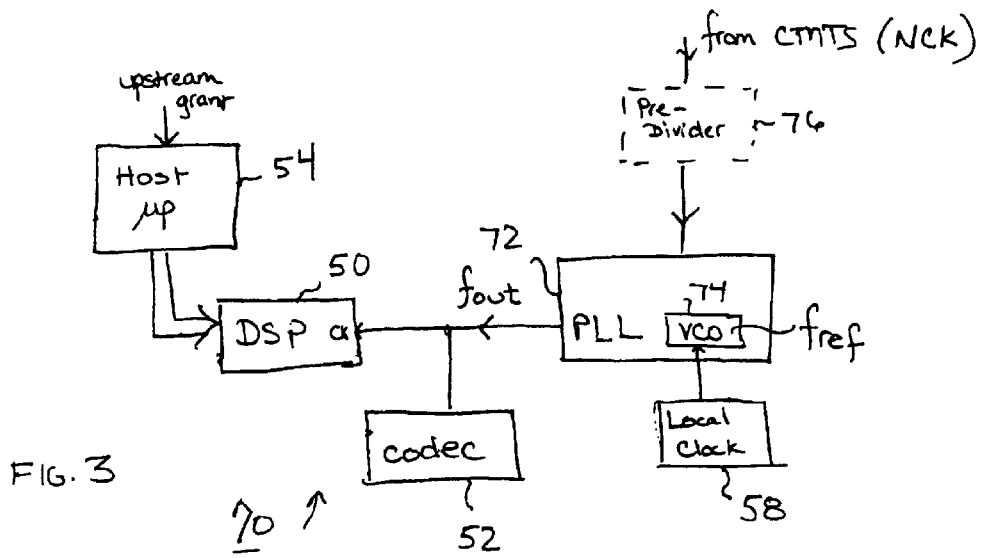
FIG. 3 illustrates an exemplary BTI unit incorporating a phase-locked loop for clock control in accordance with the present invention.

FIG. 3 illustrates an exemplary BTI 70, formed in accordance with the present invention, to provide for a "graceful" transition between a CMTS-provided national clock signal and a local signal upon failure/loss of the national clock signal. The components which are essentially common between BTI 50 of FIG. 2 and BTI 70 of FIG. 3 carry the same reference numerals and their description will not be repeated. As shown (more particularly in FIG. 4), an improvement in transitioning between a CMTS-provided national clock signal and a local clock signal is provided by utilizing a phase-locked loop (PLL) 72. PLL 72 is formed to include a voltage-controlled oscillator (VCO) 74 exhibiting a center frequency $f_{ref}$ at the desired PCM sample frequency. For the purposes of the present discussion, a center frequency $f_{ref}$ of 2.048 MHz will be presumed (where it is to be understood that any desired PCM sampling frequency may be used). VCO 74 is configured to have an oscillating range of $f_{ref} \pm n$ %, where n is chosen by the BTI provider to meet predetermined system expectations. In particular, the value of n is bounded by the competing interests of being large enough to accommodate the expected drift of the national clock source (and thus prevent the unnecessary switchover from the national clock to the local clock), yet small enough to protect DSP 50 and codec 52 within BTI 70 from transmitting/receiving error-filled PCM samples. Within these bounds, cost, robustness and simplicity will determine the final value of n. In one exemplary embodiment of the present invention, a value for n of 10 was found to be acceptable.

Referring again to FIG. 3, CMTS-provided national clock signal NCK is provided as a first input to PLL 72, and local clock source 58 is provided as a second input. As long as NCK is present (and not beyond the ±n % limits), PLL 72 will phase lock to NCK. The output $f_{out}$ from PLL 72 will therefore be NCK, which thereafter propagates along clock signal path 54 and is provided as an input to both DSP 50 and codec 52. When NCK is not present, or beyond the ±n % limits of PLL 72, PLL 72 will automatically enter its free-run mode. Depending on the actual implementation, the free-run frequency may be either the center frequency, $f_{ref}$, or one of the limit frequencies determined by the value of n. As a result of using a phase-locked loop circuit in accordance with the present invention, as well as the limited range of VCO 74, the PLL transition is continuous and output frequency $f_{out}$ will remain within the normal operating range of DCP 50 and codec 52 (as determined by the value of n). Illustrated in phantom in FIG. 3 is a pre-divider circuit 76 that may be used to first divide the received CMTS clock NCK to the value used by BTI 70. For example, some applications may require a PCM sample clock of 2.048 MHz may be required, where the national clock has a frequency of 4.096 MHz. In this case, a pre-divider circuit 76 may be used to half the frequency of the received clock prior to applying it as an input to PLL 72.

Figure 4:
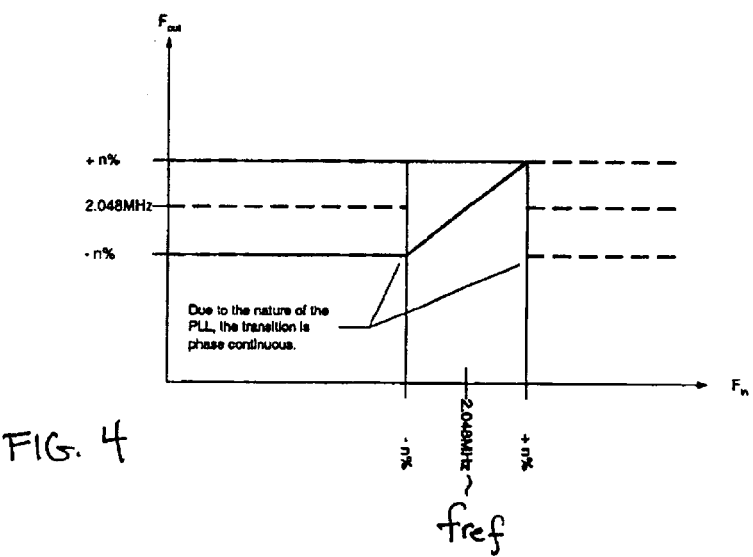
FIG. 4 is a graph of the transfer function between $f_{in}$ and $f_{out}$ provided by using the phase-locked loop in accordance with the present invention.
Figure 1:
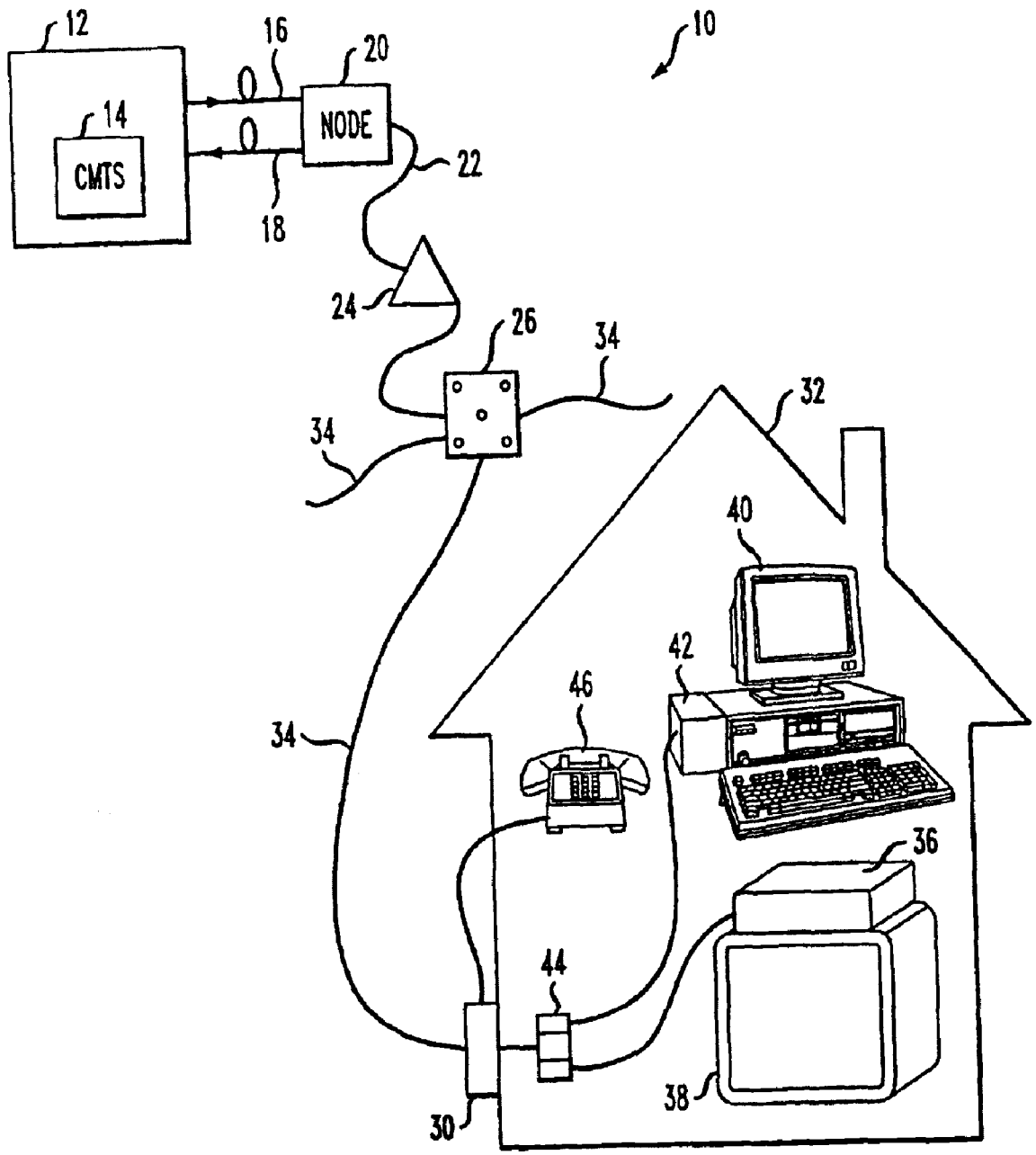
Figure 2:
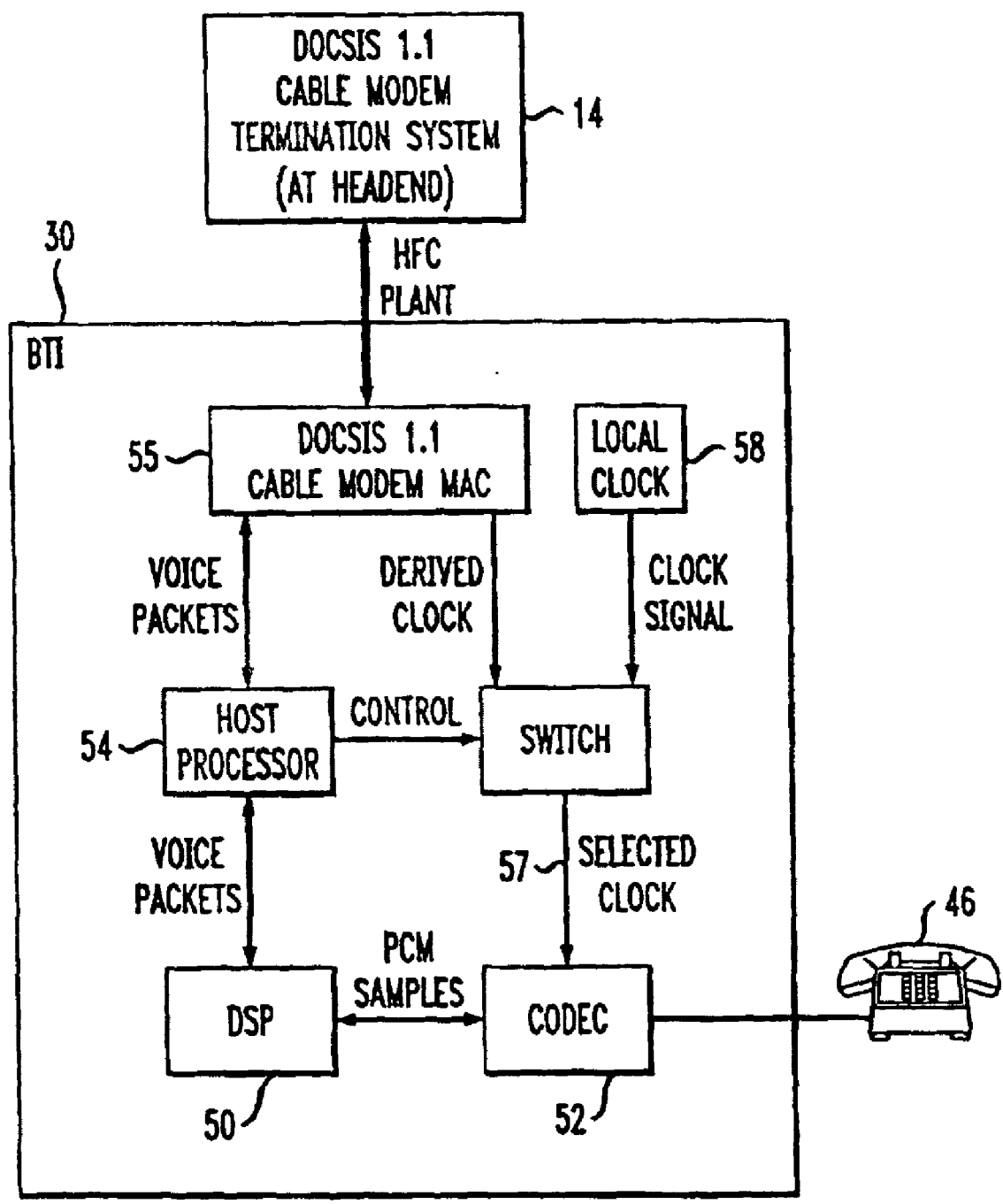
Figure 3:
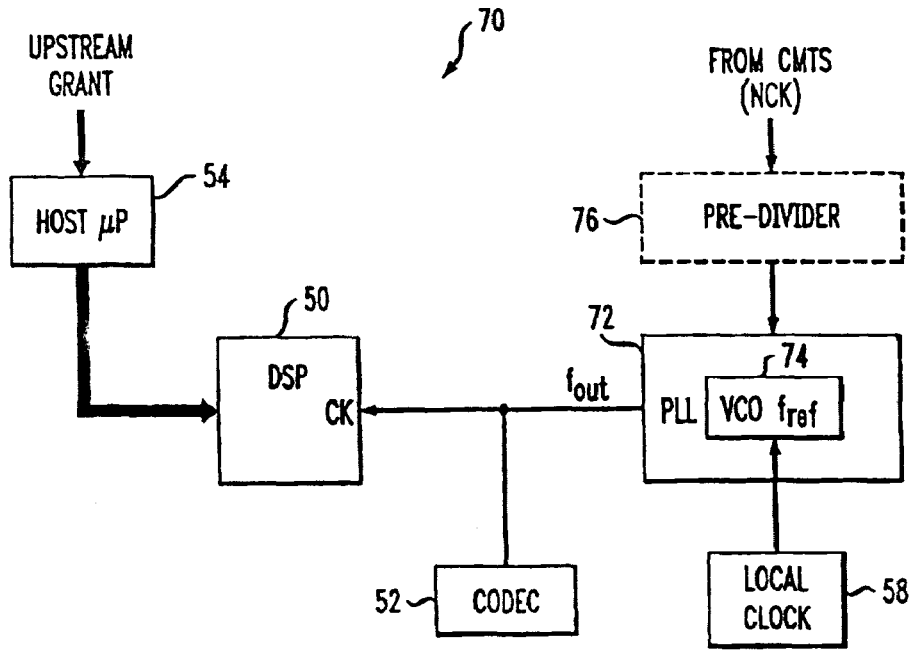
Figure 4:
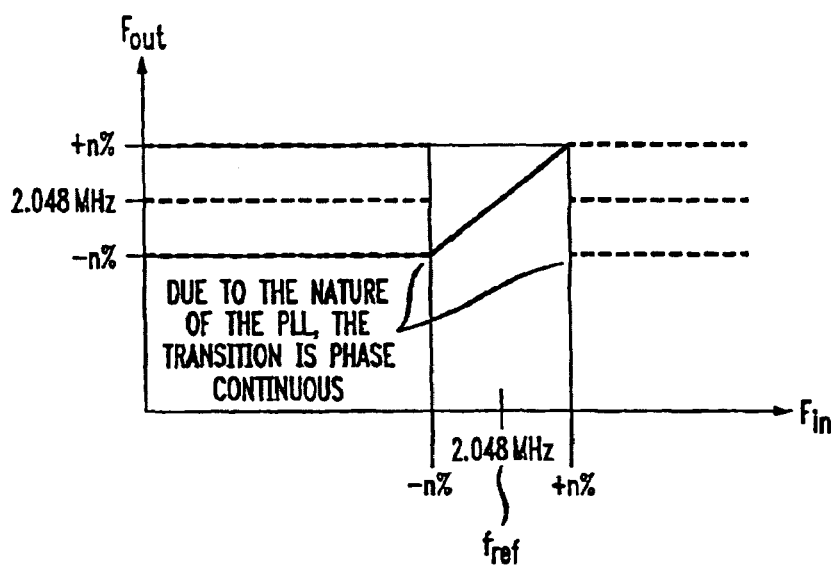

FIG. 4 illustrates an exemplary transfer function between $f_{in}$ and $f_{out}$ as provided by using PLL 72 in accordance with the present invention. As shown, output frequency $f_{out}$ will follow the input frequency $f_{in}$ (i.e., the national clock, NCK), as long as $f_{in}$ remains within the tracking range (±n %) of PLL 72. Output frequency $f_{out}$ becomes the free-running frequency of PLL 72 when the input frequency is beyond the tracking range of PLL 72. As a result of using a phase-locked loop to provide the switchover between the clocks, the transition will be phase-continuous, as shown. In most cases, the free-running frequency of a PLL is the center frequency, $f_{ref}$. However, the upper or lower bounds may also be used.

Although this invention has been illustrated by reference to specific embodiments, it will be apparent to those skilled in the art that various changes and modifications may be made which clearly fall within the spirit and scope of the invention. Indeed, the present invention is intended to be limited only by the scope of the claims appended hereto.

What is claimed is:

1. A broadband terminal interface unit for use in a bi-directional HFC communication network, said broadband terminal interface unit for supporting the transmission of packetized audio signals between an end-user and a common network element in said HFC communication network and comprising a codec element responsive to audio signals originating at an end-user and generating as an output a coded representation thereof at a predetermined clocking frequency and also responsive to coded signals received from said HFC communication network and generating as an output a decoded audio signal to said end-user;

a digital signal processor, responsive to the coded output from said codec element for assembling said coded output into packets, and responsive to the coded input from said HFC communication network for disassembling said coded input at the predetermined clocking frequency; and a phase-locked loop responsive to both a national clock signal generated in said HFC network and a local clock source for generating the predetermined clocking frequency and providing said predetermined clocking frequency as an input to said codec and digital signal processor, said phase-locked loop locking onto the national clock signal when said national clock signal is present and within a predetermined tracking range of ±n%, and locking onto the local clock source when said national clock signal is not both present and within a predetermined tracling range of ±n%.

2. A broadband terminal interface unit as defined in claim 1 wherein the broadband terminal interface unit further comprises a pre-divider circuit disposed at the first input to said phase-locked loop for reducing the national clock signal to a predetermined lower frequency used by said broadband terminal interface unit.

3. A broadband terminal interface unit as defined in claim 2 wherein the national clock comprises a frequency of approximately 4.0996 MHz and the pre-divider circuit reduces said frequency in half to generate a 2.048 MHz input to the phase-locked loop.

4. A broadband terminal interface unit as defined in claim 1 wherein the phase-locked loop includes a voltage-controlled oscillator exhibiting a center frequency equal to the national clock frequency.

5. A broadband terminal interface unit as defined in claim 1 wherein n is approximately equal to 10.

6. A broadband terminal interface unit as defined in claim 1 wherein the national clock signal operates at approximately 4.096 MHz and the local clock provides a reference frequency of approximately 4.096 MHz.

7. A broadband terminal interface unit as defined in claim 1 wherein the national clock signal operates at approximately 2.048 MHz and the local clock provides a reference frequency of approximately 2.048 MHz.

\* \* \* \* \*

UNITED STATES PATENT AND TRADEMARK OFFICE
CERTIFICATE OF CORRECTION

| | | |
|---|---|---|
| PATENT NO. | : 6,956,873 B2 | |
| APPLICATION NO. | : 09/861750 | |
| DATED | : October 18, 2005 | |
| INVENTOR(S) | : David Beryl Lazarus | |

It is certified that error appears in the above-identified patent and that said Letters Patent is hereby corrected as shown below:

Drawings, Sheets 1 and 2, replace informal drawing sheets 1 and 2 with formal drawing sheets 1-3, which were filed on July 30, 2001 in response to the Notice to File Corrected Application papers. The PTO's receipt of the formal drawing sheets is confirmed by the enclosed stamped copies that were printed via the PAIR system.

Specification, Col. 2, line 29, after "will", change "remaining" to -- remain --.

Specification, Col. 3, line 64, after "resulting", insert -- in --.

Claim 1, Col. 6, line 12, change "tracling" to -- tracking --.

Signed and Sealed this

Seventeenth Day of October, 2006

JON W. DUDAS
*Director of the United States Patent and Trademark Office*